(12) United States Patent
Yoon et al.

(10) Patent No.: US 7,929,850 B2
(45) Date of Patent: Apr. 19, 2011

(54) METHOD FOR MEASURING DISTANCE USING A CAMERA MODULE

(75) Inventors: Chang-Hyun Yoon, Seoul (KR); Chang-Ki Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 778 days.

(21) Appl. No.: 11/655,565

(22) Filed: Jan. 18, 2007

(65) Prior Publication Data

US 2007/0189751 A1 Aug. 16, 2007

(30) Foreign Application Priority Data

Jan. 18, 2006 (KR) .................. 10-2006-0005331

(51) Int. Cl.
- G03B 17/00 (2006.01)
- G03B 3/10 (2006.01)
- G03B 13/34 (2006.01)
- G03B 19/00 (2006.01)
- G03B 15/02 (2006.01)

(52) U.S. Cl. .............. 396/72; 396/82; 396/85; 396/121; 396/429; 348/347; 359/676

(58) Field of Classification Search .................. 396/147, 396/72, 79, 80, 81, 82, 85, 429, 529, 131; 348/240.99, 240.3, 335, 345, 347; 455/422.1, 455/550.1, 556.1, 556.2; 359/676, 693, 698, 701, 705, 721, 823

See application file for complete search history.

(56) References Cited

U.S. PATENT DOCUMENTS

| | | | |
|---|---|---|---|
| 2002/0080257 A1* | 6/2002 | Blank | 348/345 |
| 2007/0031136 A1* | 2/2007 | Kakkori | 396/89 |

FOREIGN PATENT DOCUMENTS

JP 1993-119252 5/1993

* cited by examiner

*Primary Examiner* — Rochelle-Ann J Blackman
(74) *Attorney, Agent, or Firm* — The Farrell Law Firm, P.C.

(57) ABSTRACT

Provided is a method and apparatus for measuring a distance between an object and a user using a camera module. According to the method, when the camera module is driven, a zooming function is performed to examine whether an image is formed on an image device. When the zooming function is completed, a focusing function is performed to examine whether focusing is adjusted. When focusing is adjusted, a focal length "f" and a distance "b" between a lens and the image device are calculated. Thereafter, a distance "a" between an object and a user is calculated and displayed using a lens Equation. Since a distance between a desired object and a user can be measured only using a zoom function and a focusing function of an existing camera module without a separate distance measurement device, the distance between the desired object and a user can be easily measured without increase in a volume of an apparatus or manufacturing costs.

14 Claims, 6 Drawing Sheets

METHOD FOR MEASURING DISTANCE USING A CAMERA MODULE

PRIORITY

This application claims priority under 35 U.S.C. §119 to an application filed in the Korean Intellectual Property Office on Jan. 18, 2006 and assigned Serial No. 2006-5331, the contents of which are incorporated herein by reference.

BACKGROUND OF THE INVENTION

1. Field of the Invention

The present invention relates generally to a camera module having a focusing function, and in particular, to a method for measuring a distance using a camera module, capable of measuring a distance between a desired object and a user only through an operation of focusing on the desired object.

2. Description of the Related Art

A variety of methods for measuring a distance between a desired object and a user have been previously provided. For example, the methods include methods for measuring a close distance of several meters between an object and a user, and methods for measuring a long distance ranging from several hundred meters to several kilometers between an object and a user.

The methods for measuring the close distance use ultrasonic waves. The methods using the ultrasonic waves transmit ultrasonic waves to an object, sense the waves reflected by the object, and measure a distance up to the object using a time consumed until the waves come back and speed of the waves. For example, a device using such ultrasonic waves is installed in a rear bumper of a vehicle and provides a distance, from the vehicle to an obstacle, to a driver in real-time when the vehicle is in reverse, thereby preventing an unexpected accident in advance. Also, a laser device is used to measure a relatively long distance. The laser device also emits a laser beam onto an object to be measured using a predetermined laser generator, and measures a distance up to the object using a time consumed when the beam is reflected by the object and comes back, and speed of the laser beam. The laser device can also be used in a construction spot or for military purposes.

In a conventional art, a device for performing distance measurement is provided independently or provided additionally to a predetermined device. For example, a portable terminal having the above-described device for measuring a distance often appears. That is, the portable terminal has an ultrasonic wave or laser beam generator as a light-emitting unit, and a light-receiving unit for receiving ultrasonic waves, a laser beam, and so forth reflected by an object. Therefore, a user can measure a distance between a desired object and a user.

However, when the above-described device for measuring a distance is additionally provided to other apparatus, the device should be separately provided, which generates space limitation. Even when a space is secured, a whole volume of an apparatus increases, which is contradictory to a recent miniaturization trend, and additional manufacturing costs are generated.

SUMMARY OF THE INVENTION

An object of the present invention is to substantially solve at least the above problems and/or disadvantages and to provide at least the advantages below. Accordingly, an object of the present invention is to provide a method and an apparatus for measuring a distance using a camera module without a separate device.

Another object of the present invention is to provide a method for measuring a distance using a camera module not requiring separate installation costs since the camera module being used is already installed.

A further object of the present invention is to provide a method and an apparatus for measuring a distance between an object and a user of a portable terminal using the portable terminal having a camera module.

According to an aspect of the present invention, a method for measuring a distance between an object and a user using a camera module includes when the camera module is driven, driving a zooming function to examine whether an image is formed on an image device; when the zooming function is completed, driving a focusing function to examine whether focusing is adjusted; when the focusing is adjusted, calculating a focal length "f" and a distance "b" between a lens and the image device; and calculating as well as displaying a distance "a" between an object and a user using a lens equation.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Though the present invention is described and illustrated using a portable terminal having a camera module for its embodiment, the present invention can be also applied to a camera apparatus having a camera module independently or other apparatus having a camera module.

Figure 1:
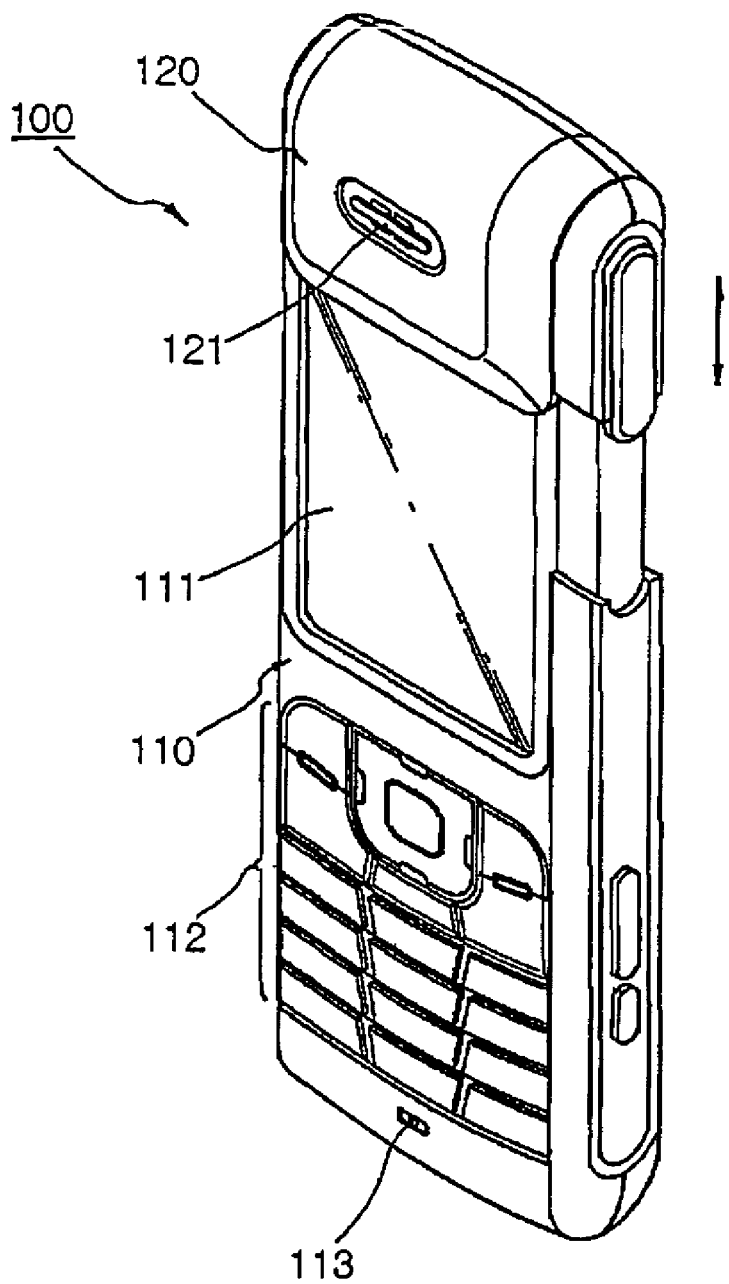
FIG. 1 is a front perspective view of a general portable terminal.
Figure 2:
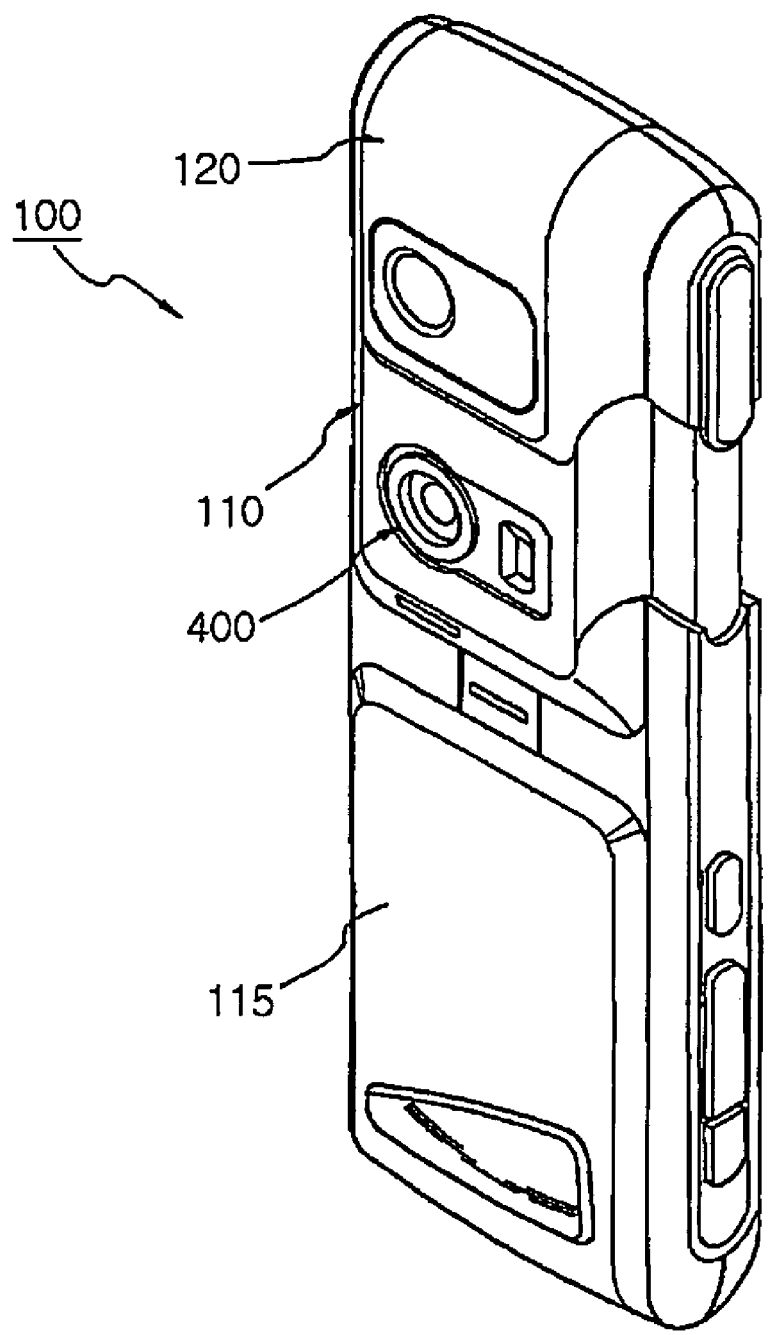
FIG. 2 is a rear perspective view of a portable terminal to which a camera module according to the present invention is applied.

FIG. 1 is a front perspective view of a general portable terminal 100, and FIG. 2 is a rear perspective view of a portable terminal 100 to which a camera module 400 according to the present invention is applied.

Though the present invention is described using a pop-up type terminal where an upper portion of the terminal is movable, the present invention can also be applied to a variety of terminals having a camera module.

Referring to FIGS. 1 and 2, the portable terminal 100 includes a main body 110 and a pop-up body which is movable from the main body 110 in a longitudinal direction of the terminal 100. The pop-up body 120 can function to selectively shield part of a display device 111 installed in the main body 110 and protect a camera module 400 illustrated in FIG. 2.

A keypad assembly 112 having a plurality of key buttons is installed in the main body 110 and can be used as a means for data input. A microphone 113 is installed below the keypad assembly 112 to deliver a user's voice to the other party during conversation. Since a speaker 121 is installed in the pop-up body 120, a position of the speaker 121 can change according to a movement of the pop-up body 120.

Referring to FIG. 2, a camera module 400 is installed in a rear side of the pop-up type terminal 100. In detail, the camera module 400 is installed in the main body 110 and located above a battery pack 115, which is a power supply means. Therefore, the terminal 100 displays an object using the display device 111 and shoots the object at a desired size and multiplication, thereby functioning as a digital camera.

In addition to the digital camera function, the terminal 100 measures a distance between an object to be shot and a user according to key input by a user. Therefore, after a user enters a mode for measuring a distance under a shooting mode, when key input is made by a user, a distance between an object and a user is displayed on the display device. Also, a user can directly enter the mode for measuring the distance without the shooting mode to measure a distance between an object and a user. Both cases can be used after driving of the camera module.

Figure 3:
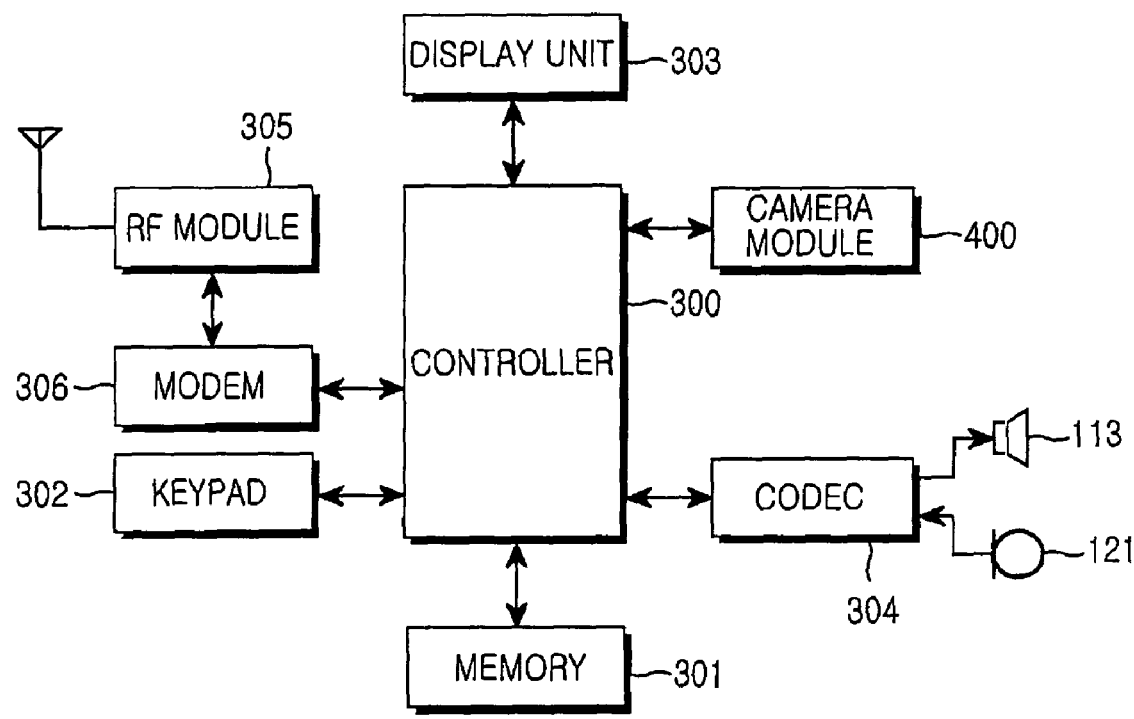
FIG. 3 is a block diagram illustrating a portable terminal for controlling a camera module according to the present invention.

FIG. 3 is a block diagram illustrating a portable terminal for controlling a camera module according to the present invention. A controller (e.g., microprocessor unit (MPU)) 300 controls an overall operation of the terminal 100 and can control operation generated by the camera module 400. For example, the controller 300 can perform a zoom function of the camera module 400 using one of the key buttons of the terminal 100 and control an image formed on a Complementary Metal Oxide Semiconductor (CMOS) to be automatically and/or manually focused together with the zoom function. Furthermore, the controller 300 can finally calculate an actual distance between an object and a user using a lens Equation according to the present invention and control the calculated distance to be displayed on the display device 111 of the terminal 100.

A memory 301 includes a program memory, a data memory, and a non-volatile memory. When a separate memory is not provided to the camera module, the memory 301 can store an image data or can serve as a buffer for temporarily storing initial data during measurement of a distance according to the present invention.

A keypad 302 has a plurality of key buttons such as numeric key buttons (e.g., 0-9), a Menu button, a Cancel button, a Confirmation button, a Send button, an End button, an Internet connect button, and a Navigation key button. When a user presses one of these key buttons, a data corresponding to the pressed key is delivered to the controller 300. Also, the keypad 302 can be used as a shutter button when the terminal 100 is used in a digital camera mode that uses the camera module according to mode switching by a user, or can be used as a measurement button during a distance measurement mode.

A display unit 303 displays messages generated during performance of a program and state information of the terminal 100, and can display a distance between an object and a user.

A coder-decoder (codec) 304 connected to the controller 300 reproduces received audio signals through a speaker 113 or transmits transmitted audio signals generated from a microphone 121 to the outside under control of the controller 300. That is, the codec 304 converts Pulse Code Modulation (PCM) data from the controller 300 into analog voice/acoustic signals and outputs the converted signals through the speaker 113. The codec 304 also converts voice/acoustic signals received through the microphone 121 into PCM data and provides the converted PCM data to the controller 300.

A Radio Frequency (RF) module 305 lowers the frequency of RF signals received through an antenna and provides the same to a modem 306. Otherwise, the RF module 305 raises the frequency of baseband signals from the modem 306 and transmits the same through the antenna. The modem 306 processes baseband signals transmitted and received between the RF module 305 and the controller 300. For example, during transmission, the modem 306 performs channel coding and spreading on data to be transmitted. Alternatively, during reception, the modem 306 performs dispreading and channel decoding on received signals.

Figure 4:
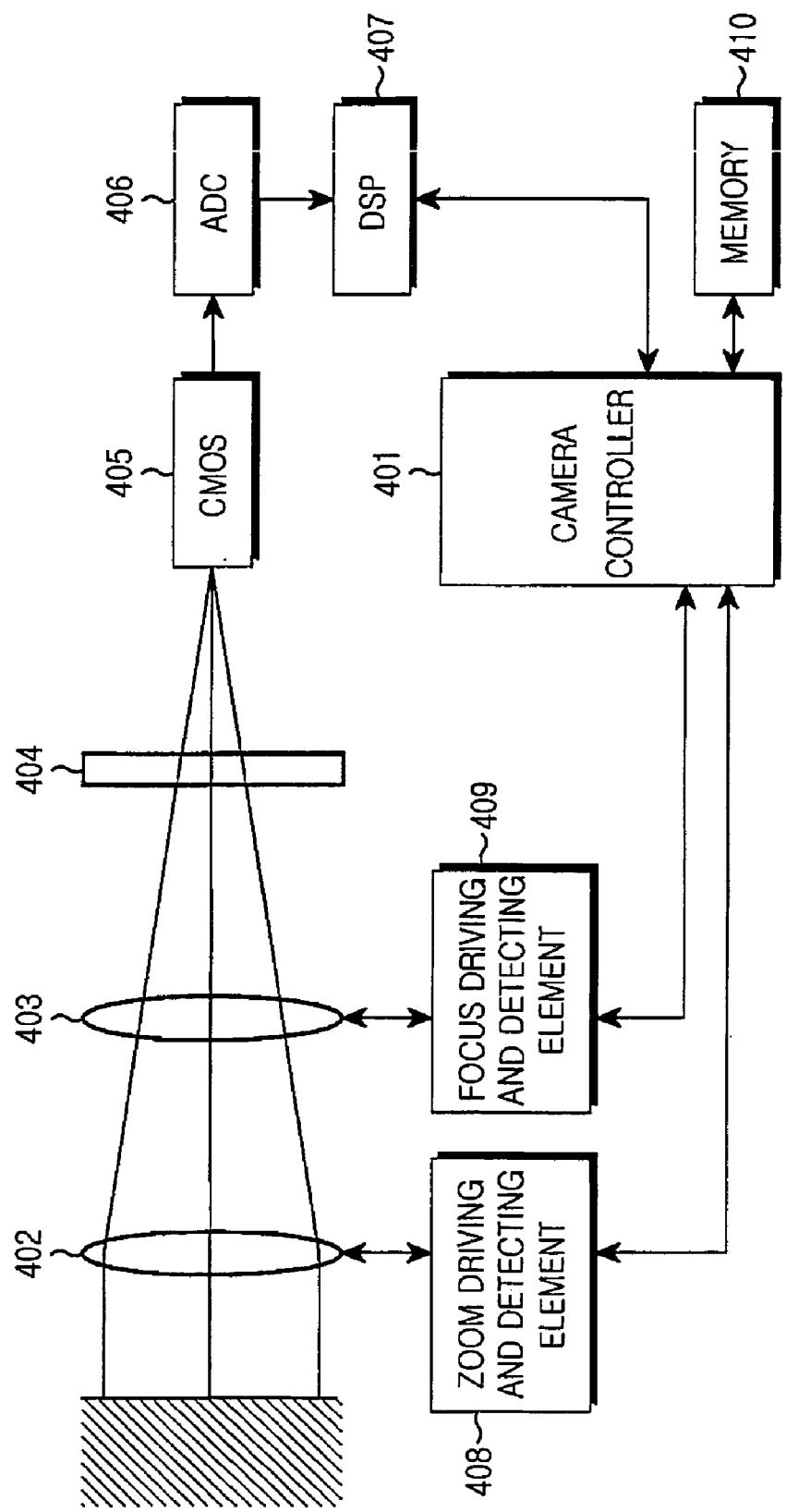
FIG. 4 is a block diagram illustrating a camera module according to the present invention.

FIG. 4 is a block diagram illustrating a camera module according to the present invention, which includes all elements required when camera module is used as a digital camera. Therefore, the elements shown in FIG. 4 can be applied as elements when the camera module is independently used for a general digital camera or even when the camera module is additionally used for other apparatus.

The camera module shown in FIG. 4 includes a plurality of lens groups 402, 403, and 404; driving and detection elements 408 and 409 for driving the lens groups and detecting a driven position; a CMOS 405, which is an image sensor, for forming an image of an object using the lens group; an Analog-to-Digital Converter (ADC) 406 for converting a shot image signal whose gain has been controlled by the CMOS 405 into a digital signal and outputting the converted digital signal; a Digital Signal Processor (DSP) 407 for processing a shot image signal digital-converted by the ADC 406 into an image signal and transmitting the processing image signal to a camera controller 401; and a memory 410 for storing data required for performing various operations of the camera module, temporarily storing image data coming through a lens unit, a focal length and distance data between a lens and the CMOS according to a lens Equation.

The lens groups can include a zoom lens unit 402, a focus lens unit 403, and an Iris lens unit 404. Each of the lens units 402, 403, and 404 includes a plurality of lenses that are installed in a predetermined barrel moving back and forth. When a distance of each lens is adjusted to allow an image of an object to be accurately formed on the CMOS 405.

The zoom lens unit 402 is driven such that an image of an object is approximately formed on the CMOS, and the focus lens unit 403 is driven such that the image formed on the CMOS by the zoom lens unit 402 is accurately focused.

Therefore, the zoom lens unit 402 includes the zoom driving and detecting element 408. The zoom driving and detecting element 408 can include a predetermined driving motor and a detecting element for detecting and outputting a displacement of a zoom lens moved by the driving motor. The detecting element can include an encoder for detecting rotation of the driving motor and a photo sensor.

Also, the focus lens unit 403 includes the focus driving and detecting element 409. The focus lens unit 403 can be controlled manually or automatically depending on an application state of an apparatus. For example, when a focusing operation is automatically performed, an auto focusing motor is used. When a user performs a focusing operation manually, a separate rotation element for rotating a focus lens may be provided. Also, for manual and auto focus operations, a detecting element for detecting a position change of the focus lens is used. The detecting element may include a known detecting element such as an encoder and a photo sensor.

Generally, the CMOS 405 includes a Charge Coupled Device (CCD) and a Correlated Double Sampling/Auto Gain Control (CDS/AGC). The CCD converts a light signal from an object that has passed through the lens group 402, 403, and 404 into a shot image signal and outputs the converted image signal. The CDS/AGC correlated-double-samples the output shot image signal and controls a gain of the shot image signal. The correlated-double-sampling operation removes noises of a shot image signal created by the CCD.

Although not shown, the memory 410 can be divided into two regions. One region can store data required for performing various operations of the camera module 400. A Static Random Access Memory (SRAM) can be suitably used for the one region. The other region can be a buffer memory for temporarily storing an image introduced through the lens groups or intermediate data (i.e., data "F" and "B" which will be described below) required for applying a lens equation according to the present invention. A Dynamic Random Access Memory (DRAM) can be suitably used for the other region.

Figure 5:
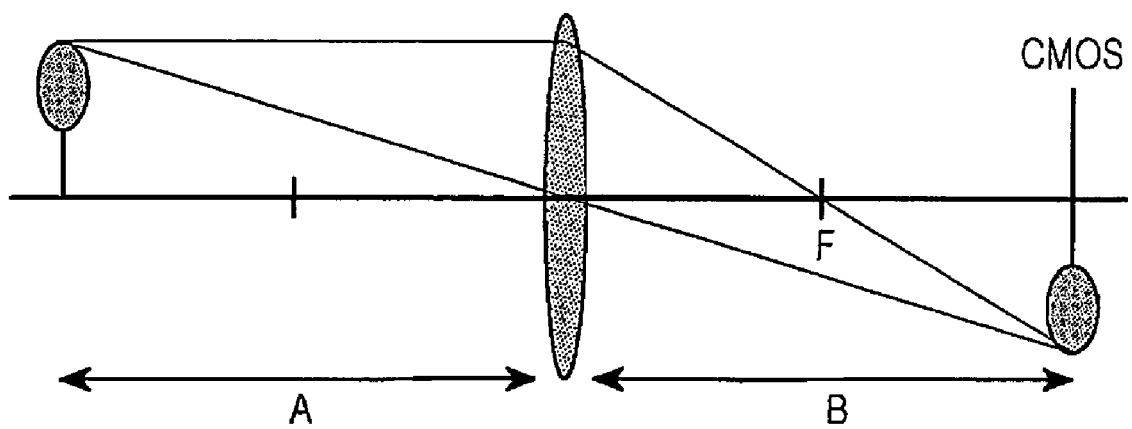
FIG. 5 is a view explaining a lens law used for measuring a distance according to the present invention.

FIG. 5 is a view explaining a lens law used for measuring a distance according to the present invention, and is used for measuring a distance between an object and a user according to the present invention.

A method for measuring a distance between an object and a user using Equation (1), $$\frac{1}{a} + \frac{1}{b} = \frac{1}{f} \quad (1)$$

$$a = \frac{bf}{(b-f)},$$

where a is a distance between an object and a focus lens unit, f is a focal length, b is a distance between a focusing lens and a CMOS, will be described below.

Therefore, "a" is a distance between an object and a focus lens unit, that is, a distance between an object and a user. Further, "f" and "b" are values that can be obtained by manipulating the camera module 400. That is, it is possible to calculate the distance "a" between an object and a user using a focal length "f" obtained by a user adjusting the focus lens unit (in case of a manual operation) and/or obtained by automatic adjustment, and a distance "b" between the focus lens unit and the CMOS at this point.

Figure 6:
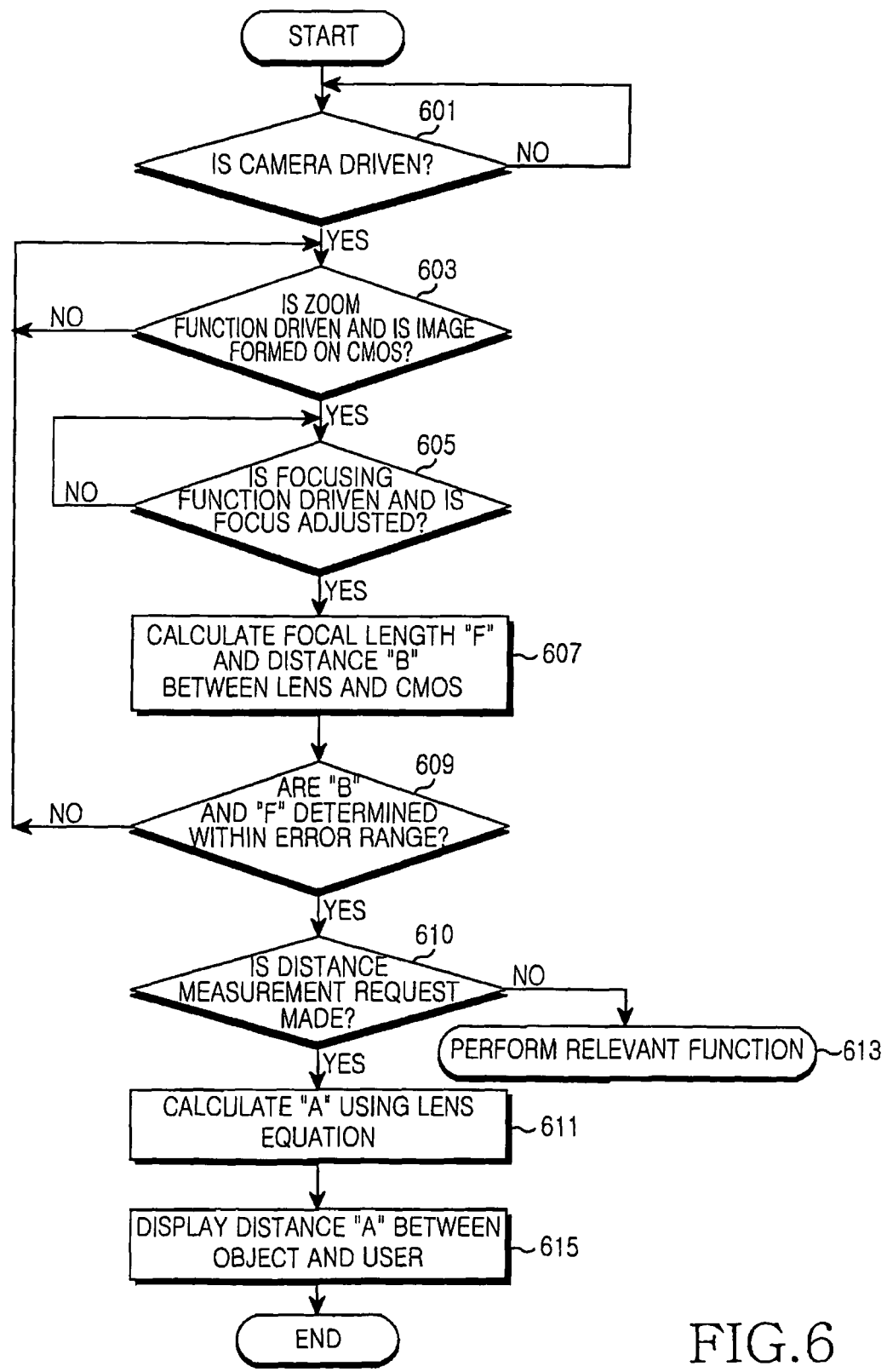
FIG. 6 is a flowchart illustrating a distance measuring process using a camera module according to the present invention.

FIG. 6 is a flowchart illustrating a distance measuring process using a camera module according to the present invention. Since a method for measuring a distance according to the present invention can be applied to a general digital camera or other apparatus additionally having a camera module as well as a portable terminal, the controller that will be described below can be a main controller of each apparatus or a camera controller of a digital camera.

A method for measuring a distance according to the present invention will be described with reference to FIGS. 4 to 6.

Foremost, the camera controller 401 performs step 601 of examining whether a camera operation of an apparatus is performed. For example, step 601 can be an operation of examining whether a camera driving mode has been performed by a terminal controller in case of a portable terminal, or can be an operation of detecting a "Power On" state or a state where a shutter is manually opened in case of a digital camera.

Thereafter, in step 603, a zoom function is driven to examine whether an image is formed on the CMOS. At this point, a user presses a zoom driving button installed in a terminal or a camera main machine to allow an image of a desired object to be formed on the CMOS. That is, a point at which zoom driving is completely set and a focusing function starts to be performed in step 605 can be a reference for judging whether a zoom function has been performed.

The focusing function in step 605 adjusts an image such that the image formed on the CMOS has sharpness of a predetermined level or greater. The focusing function can be manually set by a user or automatically set (i.e., auto focusing). When a user manually sets the focusing function, a user can adjust an image to an optimum sharpness while viewing an image enlarged or reduced by the zoom function. Also, the focusing function is automatically set, a focusing driving element is driven by a predetermined measurement distance to search for a maximum high frequency section, the maximum high frequency section is memorized by a detecting element, and searching is performed again, so that an operation of obtaining an image of greatest sharpness is performed.

When the focusing function is completed, step 607 for calculating a focal length "f" and a distance "b" between a lens and the CMOS is performed. The focal length "f" is a distance between a focus lens unit and a point at which parallel rays that have passed through lenses converge when an image is sharply formed on the CMOS by the focusing function. The distance "b" is a distance between a focusing lens unit and the CMOS, and can be easily calculated by a detecting element for detecting a driven position of a focusing lens. The above-calculated distance "b" and focal length "f" are temporarily stored in a memory until a distance measurement request is made during step 610 below.

In step 609, whether a focal length "f" and a distance "b" between the lens and the CMOS calculated in step 607 are determined within an error range is judged. When the calculated "f" and "b" are not determined within the error range, for example, when a user shoots an object using a camera module and changes a direction in order to shoot another object without measuring a distance, step 609 judges such a condition, and step 603 of driving the zoom function to examine whether an image of an object is formed on the CMOS is performed again. Also, step 603 can be performed when a predetermined time elapses.

When the calculated "f" and "b" are determined within the error range, step 610 of examining a distance measurement request by a user is performed. A distance measurement request in step 610 can be performed according to a predetermined key action in case of a terminal additionally having a camera module. Also, in case of a digital camera, a distance measurement request can be received according to pressing of a shutter button. When a distance measurement request is not made, a predetermined function 613 is performed after a predetermined time elapses (step 613). For example, a mode for shooting an object using a camera is performed or other mode using a camera may be performed.

After that, "a" is calculated using the above-calculated "f" and "b" and a lens Equation (1) in step 611, and the calculated "a" is displayed on a display device of an apparatus in step 615.

Since the method according to the present invention can measure a distance between a desired object and a user only using a zoom function and a focusing function of an existing camera module without a separate distance measurement device, the distance between the desired object and a user can be easily measured without increase in a volume of an apparatus or manufacturing costs.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for measuring a distance between an object and a user using a camera module, the method comprising:
    driving a zooming function to examine whether an image of the object is formed on an image device of the camera module;
    driving a focusing function to examine whether focusing is adjusted;
    calculating a focal length "f" and a distance "b" between a focusing lens of the camera module and the image device; and
    calculating and displaying a distance "a" between the object and the focusing lens of the camera module using $$\frac{1}{a} + \frac{1}{b} = \frac{1}{f} \text{ so, } a = \frac{bf}{(b-f)},$$

where "a" is the distance between the object and the focusing lens of the camera module, "f" is the focal length, and "b" is the distance between the focusing lens and the image device.

2. The method of claim 1, further comprising, after the calculating of the focal length "f" and the distance "b", examining whether "f" and "b" are determined within a predetermined error range.

3. The method of claim 2, wherein, when "f" and "b" deviate from the predetermined error range, the method is performed again from the driving of the zooming function.

4. The method of claim 1, wherein the calculating of the distance "a" comprises inputting a key by the user.

5. The method of claim 1, wherein the focusing function is performed manually by the user or by automatically driving the focusing lens.

6. A method for measuring a distance between an object and a mobile terminal including a camera module, the method comprising:
    activating a zooming function for an image of the object to be formed on an image device of the camera module;
    activating a focusing function to adjust focus of the image; and
    calculating a distance "a" between the object and a focusing lens of the camera module using $$a = \frac{bf}{(b-f)},$$

where "a" is the distance between the object and the focusing lens of the camera module, "f" is a focal length, and "b" is a distance between the focusing lens of the camera module and the image device.

7. The method of claim 6, further comprising, in the step of calculating the distance "a", examining whether "f" and "b" are determined within a predetermined error range.

8. The method of claim 7, wherein, when "f" and "b" deviate from the predetermined error range in the step of examining, the method is performed again from the step of activating the zooming function.

9. The method of claim 6, wherein the calculating of the distance "a" is performed by key inputs.

10. The method of claim 6, wherein the focusing function is performed manually by the user or by automatically driving the focusing lens.

11. A mobile terminal for measuring a distance between an object and the mobile terminal, the mobile terminal comprising:
    a camera module for activating a zooming function for an image of the object to be formed on an image device of the camera module, activating a focusing function to adjust focus of the image, and calculating a distance "a" between the object and a focusing lens of the camera module using $$a = \frac{bf}{(b-f)},$$

where "a" is the distance between the object and the focusing lens of the camera module, "f" is a focal length, and "b" is a distance between the focusing lens of the camera module and the image device; and
    a controller for controlling the camera module.

12. The terminal of claim 11, wherein the camera module further performs, in the step of calculating the distance "a", examining whether "f" and "b" are determined within a predetermined error range.

13. The terminal of claim 12, wherein the camera module, when "f" and "b" deviate from the predetermined error range in the step of examining, performs again from the step of activating the zooming function.

14. A computer-readable recording medium having recorded thereon a program for measuring a distance between an object and a mobile terminal including a camera module, comprising:
    a first code segment, for activating a zooming function for an image of the object to be formed on an image device of the camera module;
    a second code segment, for activating a focusing function to adjust focus of the image; and a second code segment, for calculating a distance "a" between the object and a focusing lens of the camera module using $$a = \frac{bf}{(b-f)},$$

where "a" is the distance between the object and the focusing lens of the camera module, "f" is a focal length, and "b" is a distance between the focusing lens of the camera module and the image device.

* * * * *